May 9, 1967 G. G. BEAN 3,318,282

FINGERPRINT KIT

Filed June 11, 1964

INVENTOR
GEORGE G. BEAN
BY
ATTORNEY

United States Patent Office 3,318,282
Patented May 9, 1967

3,318,282
FINGERPRINT KIT
George G. Bean, P.O. Box 377, Mere Point,
Brunswick, Maine 04011
Filed June 11, 1964, Ser. No. 374,313
4 Claims. (Cl. 118—9)

The present invention relates to devices for use in fingerprinting such instruments as negotiable instruments and tickets, particularly when they are to be cashed for a stranger.

While devices in accordance with the invention may be used for a variety of purposes, the invention is herein discussed with particular reference to their use in supermarkets where the necessity of cashing checks for customers is a troublesome problem. The larger the store, the greater the probability that a customer, unknown to the management, will offer a check in payment of his purchases and, commonly, the check will be larger than the amount of the purchases as in the case of a pay check.

The losses due to the passing of worthless checks are substantial in all types of stores and many concerns refuse to accept checks until a customer's credit has been satisfactorily established and made of record, a practice that is not and cannot be universally followed. As a consequence, the problem remains troublesome and its solution is the general objective of the present invention.

In accordance with the invention, a person unkown to the cashier and asking to have a check cashed, is requested to endorse and to fingerprint the check. Should the check prove to be bad, the check carries its own proof-positive of the identity of the person who passed it. As a consequence, a person whose fingerprints are "on file" is not going to risk the certain consequence of passing a worthless check and a person whose fingerprints are not on file faces the certainty that they will become of record unless the check is good.

The particular objective of the invention is to provide devices that will enable one serving as cashier to ensure that the fingerprints are properly applied to the check before cashing it. This objective is attained by providing the device that has a supporting area for the instrument after fingerprints have been applied thereto, with a magnifying lens spaced above that area so that the cashier may, with a minimum of training, appraise the quality of the fingerprints and reject any check when the fingerprints are so "smudged" as to be of little or no value in identifying and convicting the criminal.

In order that acceptable fingerprints can be made on a check with maximum ease and convenience to the customer, the device is provided with a flat work surface and with both an inking pad and ink removing means and a particular objective is to have the device in the form of a support having a central area in the form of a rearwardly opening recess and a pair of recesses, one on each side of the central recess, one for the inking pad and the other for the ink removing means. The central area accommodates and supports the check and a magnifying lens, attached to the support, overlies the central area so that while the fingerprints can be quickly and easily applied to the instrument and the fingers then cleaned, the cashier may as quickly and easily appraise the validity of the fingerprints.

In the accompanying drawings, there is shown an illustrative embodiment of the invention from which these and other of its objectives, as well as its novel features and advantages, will be readily apparent.

Figure 1:
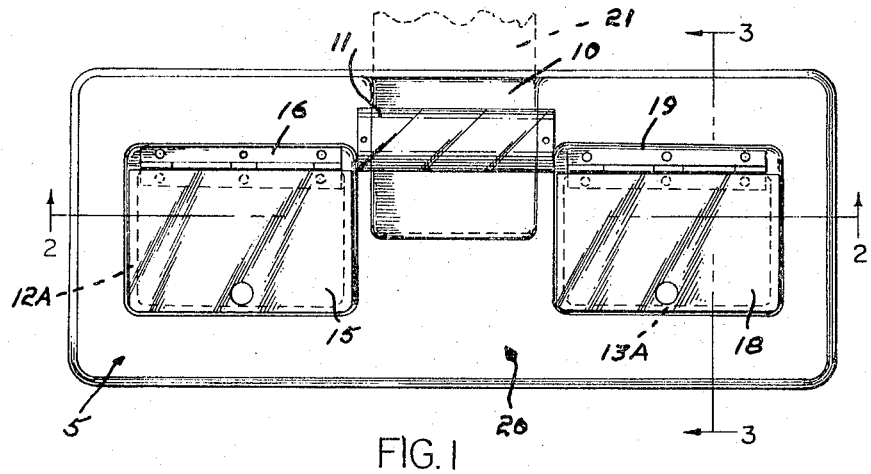
FIGURE 1 is a top plan view of a device in accordance with the invention.
Figure 2:
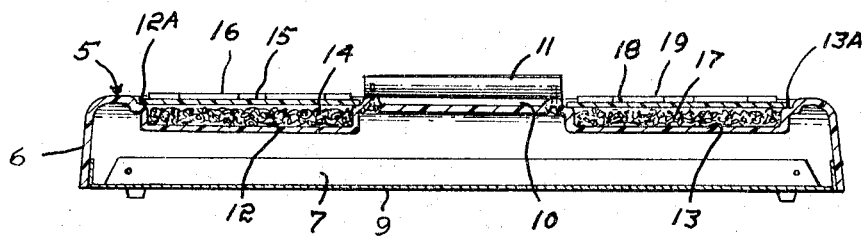
FIGURE 2 is a section taken approximately along the indicated lines 2—2 of FIGURE 1.
Figure 3:
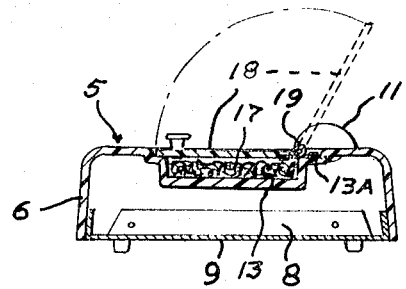
FIGURE 3 is a section taken approximately along the indicated lines 3—3 of FIGURE 1.

The device illustrated by the drawings consists of a support 5 in the form of a shell establishing a skirt 6 to which the flanges 7 and 8 of a base 9 are attached.

The support 5 has a relatively shallow, central recess 10 opening through its rear edge and a magnifying lens 11 disposed transversely of the recess 10 is detachably secured to the support 5. The support 5 also has a pair of recesses 12 and 13, one on each side of the recess 10. The recesses 12 and 13 have marginal shoulders 12A and 13A.

The recess 12 receives an inking pad 14 and is shown as closed by a cover 15 connected to one side of the shoulder 12A by a hinge 16 and dimensioned to seat against the other sides thereof. The recess 13 receives a pad 17 saturated with a finger cleaning liquid and is closed as by a cover 18 connected to a side of the shoulder 13A by a hinge 19 and dimensioned to seat against the other sides thereof.

In practice, a person, unknown to the cashier of a store, for example, and desiring to have a check cashed is requested to apply fingerprints thereto below his endorsement thereof. It will be noted that the space between the recesses 12 and 13 and in front of the recess 10 defines an area 20 large enough for the support of a check 21 while being endorsed and while having fingerprints applied thereto. The cashier then inserts the check into the recess 10 with its endorsed end supported thereby with the fingerprints visible under the lens 11 so that the cashier may quickly determine whether the prints are of an acceptable quality. The check may then be cashed as the identity of the person passing it and the fact that it was passed are now so positively established that the risk of loss is effectively minimized.

I claim:

1. In a device for use in connection with the cashing or transferring of such instruments as negotiable instruments and tickets, a support including a central area in the form of a rearwardly opening recess, a pair of recesses, one on each side of said central recess, one including an inking pad and the other ink removing means whereby the instrument may be provided with fingerprints of the person presenting it for payment and the ink coated fingers then cleaned, said central recess accommodating the end of the instrument bearing the prints, and a magnifying lens attached to said support above said central recess to enable the clarity of the prints to be appraised.

2. In a device for use in connection with the cashing or transferring of such instruments as negotiable instruments and tickets, a support including a central area in the form of a rearwardly opening recess, a pair of recesses, one on each side of said central recess, one including an inking pad and the other ink removing means whereby the instrument may be provided with fingerprints of the person presenting it for payment and the ink coated fingers then cleaned, said central recess accommodating and supporting the end of the instrument bearing the prints and terminating sufficiently short of the front of the device to provide a support for that end of the instrument while prints are being applied thereto, and a magnifying lens attached to said support above said central recess to enable the clarity of the prints to be appraised.

3. In a device for use in connection with the cashing or transferring of such instruments as negotiable instruments and tickets, a support including an area in the form of a rearwardly opening recess, a pair of recesses, one including an inking pad and the other ink removing means whereby the instrument may be provided with fingerprints by the person presenting it for payment and then clean the ink coated fingers, said rearwardly opening recess accommodating and supporting the end of the instrument bearing the prints, the device including a flat portion of sufficient area to support that end of the instrument while prints are being applied thereto, and a magnifying lens attached to said support above said central recess to enable the clarity of the prints to be appraised.

4. In a device for use in connection with the cashing or transferring of such instruments as negotiable instruments and tickets, a support including a central, spaced pair of shoulders defining a support area, a pair of recesses, one on each side of said area, one including an inking pad and the other ink removing means whereby the instrument may be provided with fingerprints of the person presenting it for payment and the ink coated fingers then cleaned, said central area accommodating and supporting the end of the instrument bearing the prints, and a magnifying lens attached to said support and spaced above said area to enable the clarity of the prints to be appraised.

References Cited by the Examiner

UNITED STATES PATENTS

| | | | |
|---|---|---|---|
| 1,539,448 | 5/1925 | White | 118—31.5 |
| 1,540,148 | 6/1925 | Waggener | 118—31.5 |
| 1,860,486 | 5/1932 | Smith et al. | 118—31.5 |
| 2,153,684 | 4/1939 | Ballard | 118—31.5 |
| 2,380,968 | 8/1945 | Kimmig et al. | 118—9 |
| 2,557,141 | 6/1951 | Rebora | 206—47 |
| 2,561,400 | 7/1951 | Morrell | 206—47 X |
| 2,569,310 | 9/1951 | Hitt | 118—31.5 |
| 3,039,128 | 6/1962 | Fisher | 118—503 X |

FOREIGN PATENTS 687,832    2/1953    Great Britain.

MORRIS KAPLAN, *Primary Examiner.*